United States Patent
Guislain et al.

(10) Patent No.: US 7,979,490 B2
(45) Date of Patent: Jul. 12, 2011

(54) METHOD FOR COMBATTING THE ILLICIT DISTRIBUTION OF PROTECTED MATERIAL AND COMPUTER SYSTEM FOR CARRYING OUT SAID METHOD

(75) Inventors: Alain Guislain, St. Sebastien sur Loire (FR); Bastien Casalta, Nantes (FR); Soufiane Rouibia, Nantes (FR)

(73) Assignee: Trident Media Guard TMG, St. Sebastien sur Loire (FR)

( * ) Notice: Subject to any disclaimer, the term of this patent is extended or adjusted under 35 U.S.C. 154(b) by 108 days.

(21) Appl. No.: 12/307,412

(22) PCT Filed: Jul. 10, 2007

(86) PCT No.: PCT/FR2007/051638
§ 371 (c)(1),
(2), (4) Date: Feb. 24, 2009

(87) PCT Pub. No.: WO2008/017772
PCT Pub. Date: Feb. 14, 2008

(65) Prior Publication Data
US 2009/0210492 A1    Aug. 20, 2009

(30) Foreign Application Priority Data
Jul. 10, 2006 (FR) ..................... 06 52892

(51) Int. Cl.
*G06F 15/16* (2006.01)
(52) U.S. Cl. ....................... 709/204; 709/205
(58) Field of Classification Search .......... 709/204, 709/205; 705/51
See application file for complete search history.

(56) References Cited

U.S. PATENT DOCUMENTS

| 7,761,569 B2 * | 7/2010 | Hopkins ............... 709/226 |
| 2003/0061287 A1 * | 3/2003 | Yu et al. ............... 709/205 |
| 2005/0108248 A1 * | 5/2005 | Natunen ............... 707/10 |
| 2005/0203851 A1 * | 9/2005 | King et al. ............. 705/51 |
| 2005/0267945 A1 | 12/2005 | Cohen et al. |

(Continued)

FOREIGN PATENT DOCUMENTS
WO    WO 2004/107704 A2    12/2004
(Continued)

OTHER PUBLICATIONS

"UniteTheCows—Kazaa Participation Hack;" Tong Family Blog; Oct. 7, 2002; Retrieved from the Internet; http://www.tongfamily.corn/music/unitethecows_ka.php>; (Retrieved on Jan. 31, 2007).

(Continued)

*Primary Examiner* — Patrice L Winder
*Assistant Examiner* — Asghar Bilgrami
(74) *Attorney, Agent, or Firm* — Oliff & Berridge, PLC

(57) ABSTRACT

The invention relates to a method for hindering or preventing the illegal distribution of protected data in a peer-to-peer network comprising at least one peer operating an exchange program designed for distribution of data to at least one client according to a selective exchange protocol permitting the peer to operate a selection of clients to which the data is transferred, said selection being carried out as a function of one or more characteristics of the clients. In said method bogus data is sent to the peer such as to influence the selection of clients served by the peer, such that the peer is made to favor the transfer to authorized clients.

17 Claims, 3 Drawing Sheets

U.S. PATENT DOCUMENTS

2010/0169195 A1* 7/2010 Trest ............................. 705/34

FOREIGN PATENT DOCUMENTS

WO    WO 2006/021772 A1    3/2006

OTHER PUBLICATIONS

Figure 1:
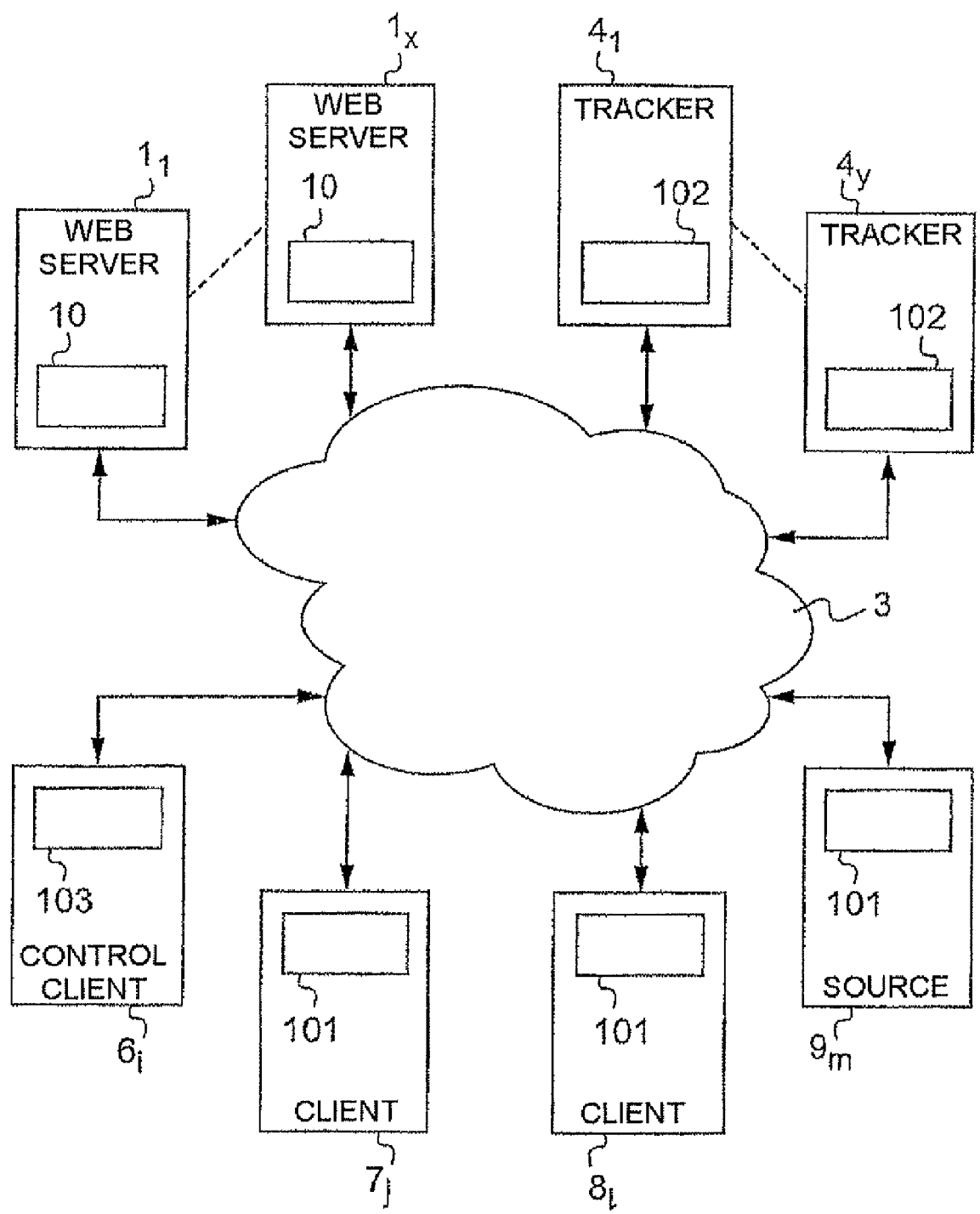

Saaf; "Written Testimony for the Oversight Hearing on 'Piracy of Intellectual Property on Peer-to-Peer Networks';" Sep. 26, 2002; Retrieved from the Internet; http://www.mediadefender.com/press%20about%20MD/randy_saaf_testimony.htm (Retrieved on Oct. 6, 2004).

Anagnostakis et al; "Exchange-based Incentive Mechanisms for Peer-to-Peer File Sharing;" Distributed Computing Systems—Proceedings; Mar. 24, 2004; pp. 524-533; 24$^{th}$ International Conference on Hachioji, Tokyo, Japan; Piscatway, New Jersey, USA.

\* cited by examiner

METHOD FOR COMBATTING THE ILLICIT DISTRIBUTION OF PROTECTED MATERIAL AND COMPUTER SYSTEM FOR CARRYING OUT SAID METHOD

The present invention relates to methods for combatting the illicit distribution of protected material on computer networks such as the Internet.

The invention is more particularly aimed at preventing illegal downloading through peer to peer (also called P2P) exchange systems.

Currently, numerous files are distributed by means of the BitTorrent exchange system, which allows the downloading of a file split into blocks from various users connected to the network, such downloading being dubbed multisourcing.

In such an exchange system, it is usual to designate by client any user of the network, by peer any remote client connected to a current client and able to transmit all or part of the file searched for. A source designates a peer that has downloaded the entire file and whose only task is to distribute it. The peers that are not sources (leachers) are wishing to download the file but not possessing it entirely. A tracker is a server which logs those peers that are involved in the distribution of the file searched for. The term free-riders designates clients seeking to receive files without sharing same.

Unlike other P2P exchange systems, in BitTorrent the clients do not form part of a global network which would comprise all the users of the exchange system but are grouped together by files. Thus, for each file distributed, the tracker manages a dynamic directory of the relevant clients.

The BitTorrent exchange system relies on exchange software that executes at each client and that essentially implements two communication protocols.

The first protocol relates to the exchanges between the trackers and the clients. When a client wishes to download a file, it contacts a tracker referencing this file and receives in return a list of computer addresses informing it of other peers for which this same file is of relevance and to which it can attempt to connect. At regular intervals, each client updates statistics of the tracker by communicating to it its state of downloading (download) of the file in question and the quantity of data sent (upload) to other clients. The data communicated to the tracker allow it to supervise the distribution of a file and, in the BitTorrent exchange system, the tracker is designed to no longer communicate information to a client not sharing sufficient information with the other clients.

The data exchanges between clients are performed according to a second protocol. The BitTorrent exchange system allows a client at one and the same time to download the file searched for and to distribute this same file to other clients. Each time that a client completes the downloading of a block, it announces it to the peers to which it is connected. This allows each client to ascertain at any moment the blocks that the peers can share. For bandwidth reasons, the number of peers that a client can serve is limited.

The exchange software installed at the client is therefore designed to select the peers to be served. A selection criterion adopted in the BitTorrent exchange system consists in determining the peers at which the client downloads quickest so as to favor the reciprocity of the exchanges. Thus, periodically, for example every ten seconds, the exchange software evaluates which peers are the most effective at serving the client by measuring the speed at which these peers send data to it.

BitTorrent can thus be dubbed a selective exchange system and creates a sort of virtuous circle during the sharing of the files, since one which gives only little or nothing will receive nothing.

In an aim to open up to the other peers of the network and in the eventuality that one at least of them were to offer a still higher download speed, the exchange software randomly cyclically tests another peer that has not yet served the client so as to ascertain whether in response to a data send, this other peer would not in its turn send same back.

When a new connection is established with a peer, the software favors the latter from among all the peers which are connected and not yet served.

When the client serving the peers is a source, the exchange software no longer takes into account when selecting the peers their upload speed, since it is then zero, but the download speed offered.

The prior art offers several conventional solutions aimed at opposing the illicit downloading of files protected by copyrights.

One of them consists in introducing poor quality files into the network, so as to discourage cybernauts, as disclosed in the applications WO 2004/107704 and US 2005/0267945. Such a solution turns out to be unsuitable when the exchange software installed at the client compares a key (hash) of the file to be downloaded with a reference key, as is the case in the BitTorrent exchange system.

The publication US 2005/0267945 describes another solution often encountered consisting in redirecting cybernauts to resources that are not available on the network or to legal download sites. This solution does not prevent a peer from being served by a source once connected to the latter.

Finally, use is also sometimes made of filters capable of analyzing a request pertaining to a file to be downloaded, as in application WO 2006/021772. Depending on the legal or illegal nature of the sharing of this file, the request is or is not transmitted. Such a solution is expensive in terms of bandwidth.

The solutions of the prior art thus turn out to be insufficiently effective in relation to selective exchange systems such as BitTorrent.

The subject of the invention is therefore a new method for hindering, or indeed eliminating, the illegal propagation of protected data in a peer to peer network, comprising at least one peer, in particular a source, executing exchange software configured to distribute data to at least one client according to a selective exchange protocol allowing the peer to make a selection of the clients to which data are transferred, this selection being performed as a function of one or more characteristics of the clients.

According to an aspect of the invention, false data are addressed to the peer so as to influence the selection of the clients served by the peer, in order to induce this peer to favor transfer to the controlled client or clients.

The expression "false data" designates data not corresponding to the real state of the controlled client.

The expression "controlled client" designates a client to which the transfer of the data is acceptable since it will not retransmit them illegally to other clients. Thus, once a controlled client has terminated the downloading of a file relating to protected material, the content of this file can be erased.

The invention makes it possible to hinder the illicit distribution of a file since it will take place at least partially to controlled clients.

A plurality of controlled clients can consist of autonomous terminals.

The controlled clients, that seek to download the same files as the other clients of the network, in particular the ones most searched for, without sharing the information received, make it possible to delay the exchanges in the network in a significant manner, or indeed even to block it. The number of controlled clients can for example be between 10 and 25.

According to an exemplary implementation of the invention, at least one controlled client connects to the tracker so as to obtain an updated list of addresses of peers, in particular of sources, in the network. Connection to the tracker can be performed in a periodic manner.

Again in an exemplary implementation of the invention, at least one controlled client can be designed to, as soon as it has received the particulars of a peer of the network able to serve it, notably a source, try to connect to this peer. These particulars may have been communicated to it by a server supervising the operation of several controlled clients.

Preferably, each controlled client does not share information with other peers of the network, so as to farther strengthen the process of combatting the illicit distribution of material, not only by occupying the sources but by avoiding redistributing downloaded data.

The false data can be addressed to a peer, in particular to a source, directly by the controlled client or clients, in particular when concerned with combatting illicit distribution based on the BitTorrent exchange system The choice of the manner in which the false data reach the peer will depend on the exchange system involved.

The method according to the invention can be implemented in a selective exchange system where the characteristic or characteristics adopted for the selection of the clients comprise the progress of the downloading of a file, as is the case in the BitTorrent exchange system. The exchange software executing at the peers can then be designed to favor the transfer of the data to clients whose downloading is the most advanced, the false data addressed by the controlled clients then being able to comprise a false indication about the progress of the download.

The characteristic or characteristics in question can further comprise an item of information relating to the upload of the client, as is also the case for the BitTorrent exchange system. The false data can then comprise a false indication relating to the upload of the controlled client.

The characteristic or characteristics concerned can also comprise the speed for downloading the peer to the client.

The characteristic or characteristics in question can furthermore comprise the number of peers with which the client exchanges information, the quantity of information already downloaded, the numbers of the blocks constituting the downloaded information and the state of the client, that is to say whether it is a leacher or a source.

Of course, these characteristics mentioned above are not limiting and may depend on the exchange system concerned.

The network can comprise at least one tracker designed to transmit to at least one client or to a peer the addresses of other clients or peers of the network. False data can be addressed to the tracker by the controlled client or clients or by a server for supervising a plurality of controlled clients or by any other computer system associated with at least one controlled client. These false data can for example comprise a false item of information relating to the quantity of data sent at least by a controlled client to other clients of the network, to the quantity of data received by a controlled client or else to the quantity of data remaining to be received within the framework of the downloading of a file, so as to prevent the tracker from ceasing to log certain controlled clients because of the absence of distribution of data to other clients.

Each controlled client can be designed to connect to the tracker so as to recover a list of addresses of clients of the network and in the case where no source address appears in the list, to reconnect to the tracker so as to obtain a new list.

In an exemplary implementation of the invention, the method comprises the step consisting in disconnecting a controlled client after the connection of the latter to a peer, in particular a source, assuming that this controlled client would not be served by the peer and that the number of controlled clients served by the peer would be less than the maximum number of clients that the peer can serve. An attempted connection to the peer of a new controlled client can follow this disconnection. The aforesaid disconnection can be controlled by the server for supervising this controlled client.

The number of controlled clients connected to each peer can be reckoned, in particular by the server for supervising the controlled clients, so as not to seek to connect a new controlled client to a peer when the latter is connected only to controlled clients and cannot serve further clients having regard to the bandwidth.

In an exemplary implementation of the invention, false data are sent to the tracker in a periodic manner, for example by the supervising server, with a period which depends on the size of the content to be downloaded and/or the number of sources in the network. These false data can be addressed by the controlled clients or by a server supervising them.

The aforesaid period is for example determined by the formula $$\begin{cases} \tau = \dfrac{T}{N_{sources}} * k \\ \text{with } \tau = 10 \text{ seconds if } N_{sources} < 50, \end{cases}$$

where T designates the size of the content of the file to be downloaded (in megabytes), k is a constant
and $N_{sources}$ is the number of sources.

According to an exemplary implementation of the invention, the controlled clients are designed to connect only to the sources. This makes it possible to increase the effectiveness of the fight against the illicit distribution of material in comparison with connection solely to peers that have not terminated downloading. Nevertheless, the invention does not exclude, in a variant implementation, connection to peers that are not yet sources.

The subject of the invention is further, according to another of its aspects, a computer system intended to hinder or eliminate the illegal propagation of protected data in a peer to peer network, in which at least one peer executes exchange software configured to distribute data to at least one client according to a selective exchange protocol allowing the peer to make a selection of the clients to which the data are transferred, this selection being per-formed as a function of data representative of one or more characteristics of the clients.

The computer system according to the invention can comprise at least one controlled client designed to generate false data so as to influence the selection of the clients to which the data are transferred by the peer and induce this peer to favor transfer to the controlled client or clients.

The computer system can comprise at least one terminal executing exchange software according to the invention making it possible to generate these false data. The terminal can be associated with a single controlled client. Nevertheless, preferably, the computer system is designed to simulate several controlled clients.

The computer system can comprise a server for supervising a plurality of controlled clients, whether the latter are simulated by one and the same machine or take the form of distinct terminals.

The subject of the invention is further a server designed to supervise a plurality of controlled clients. The server can in particular be designed to recover information originating from the supervised controlled clients. Included among this information may be the state of the downloading of a file.

The server can be designed to order the download to be stopped and the downloaded content to be destroyed when a controlled client has finished the download in question.

This server can also ensure updating of data relating to the occupancy of the peers, in particular of the sources, by the controlled clients, so as for example to indicate to the controlled clients to which peers to connect.

The invention further pertains, according to another of its aspects, to a computer program product comprising instructions readable by a computer system comprising at least one microprocessor, these instructions controlling the operation of the computer system in such a way that:

in a peer to peer network comprising at least one peer, in particular a source, executing exchange software configured to serve at least one client according to a selective exchange protocol allowing the peer to perform a selection of the clients served as a function of at least one characteristic of these clients, false data are generated by this computer system, so as to influence the selection of the clients to which the data are transferred by the peer, and induce the peer to favor transfer to the computer system, which thus constitutes during the execution of the computer program product a controlled client.

This computer program product can be recorded on any suitable support, for example optical or magnetic disk, electronic memory or magnetic tape, The computer program product can further be downloaded onto a terminal intended to constitute a controlled client from a remote computer system.

The subject of the invention is further a controlled client as such.

The subject of the invention is further, according to another of its aspects, a method for hindering, or indeed eliminating, the illegal propagation of protected data in a peer to peer network comprising at least one peer executing exchange software configured to distribute data to at least one client according to a selective exchange protocol allowing the peer to make a selection of the clients to which data are transferred, this selection being performed as a function of data characteristic of the clients, this network comprising at least one tracker logging addresses of peers able to serve a client, in which method false data are generated to the tracker by one or more controlled clients or by a server for supervising the latter.

It is thus made possible for the controlled client or clients to remain logged by the tracker even if they do not share the downloaded data with other peers of the network.

Figure 2:
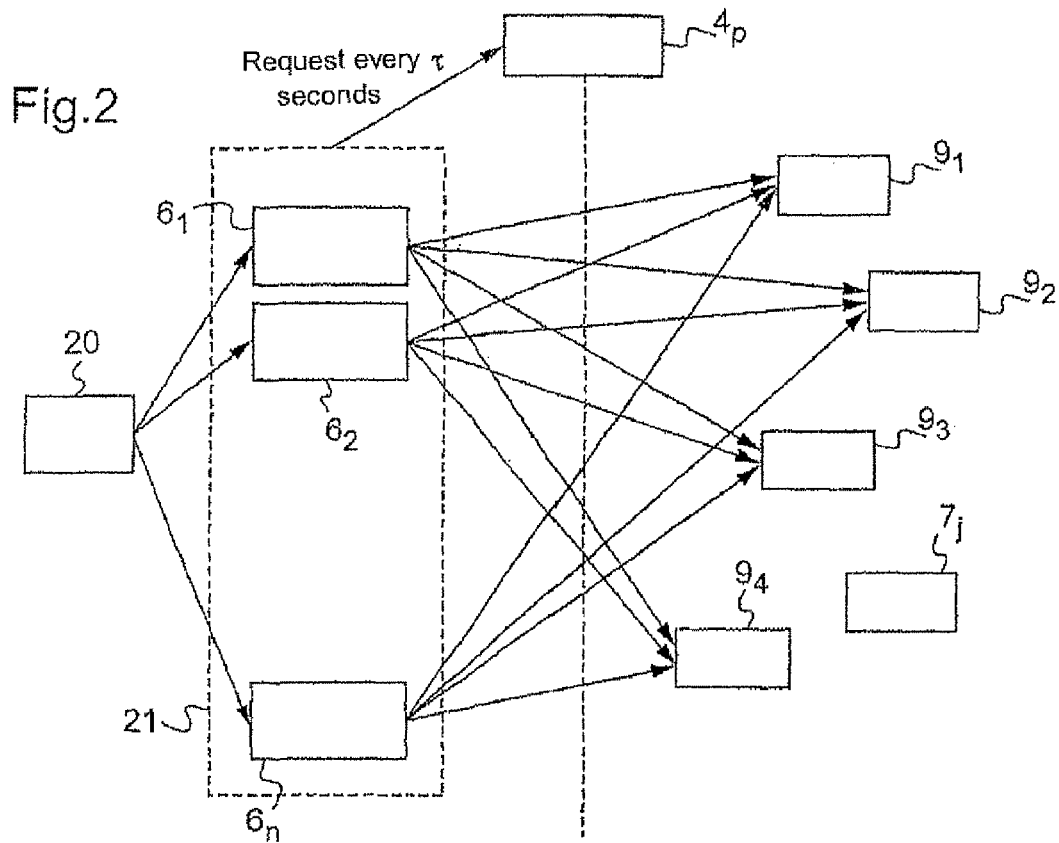
Figure 3:
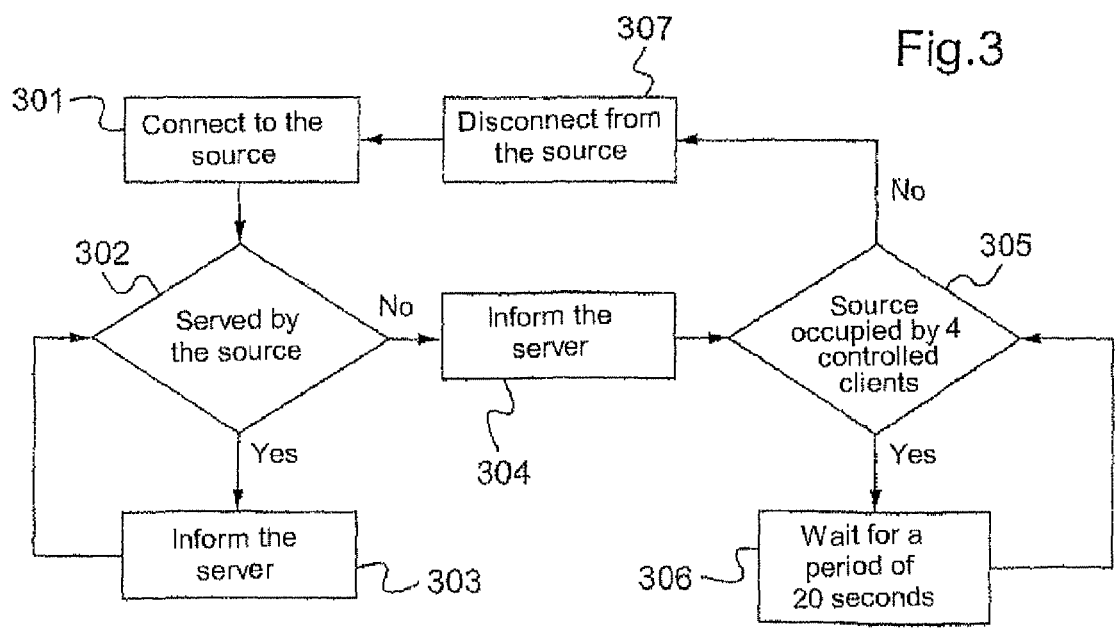
Figure 4:
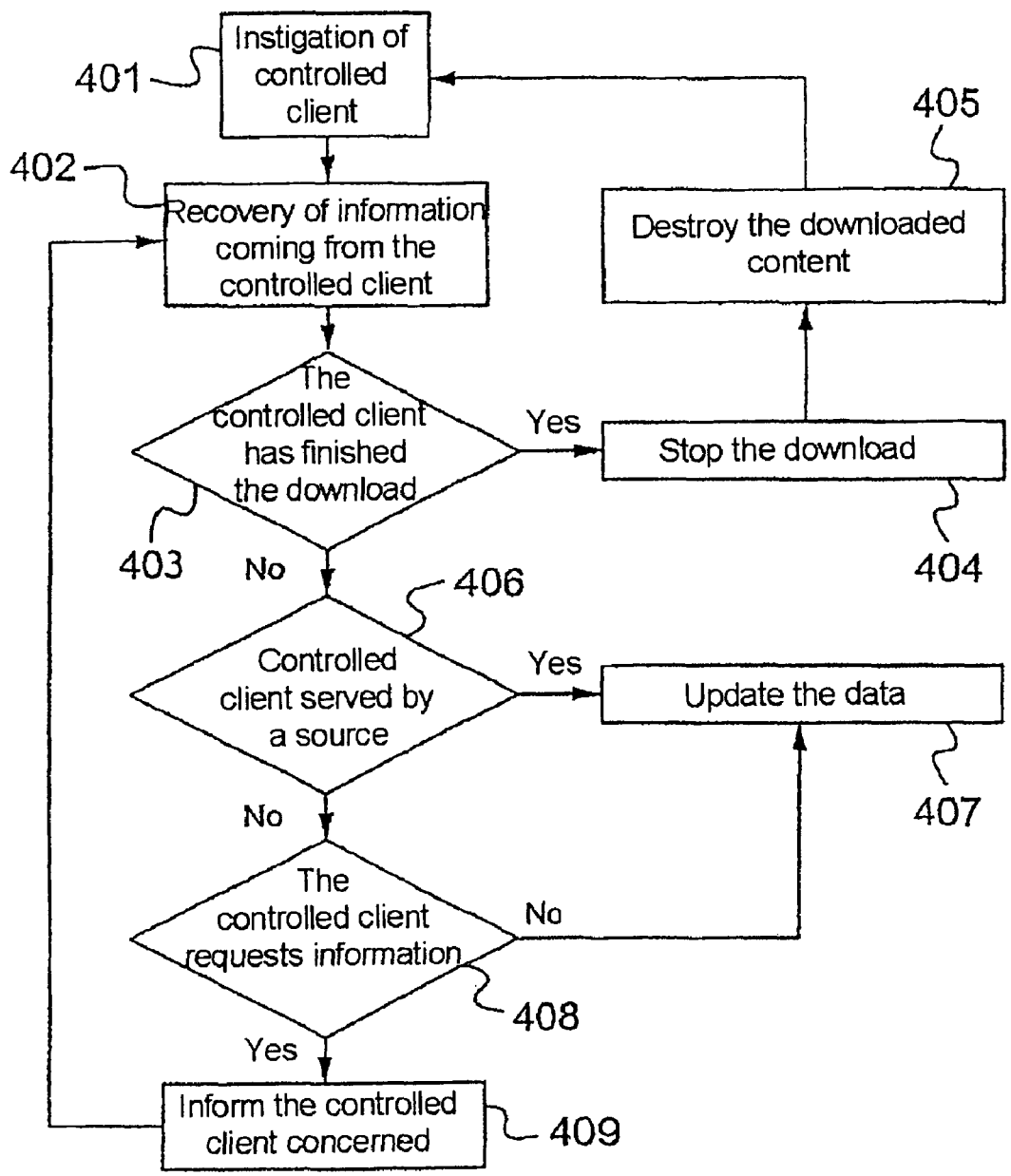

The invention may be better understood on reading the detailed description which will follow of an exemplary non-limiting implementation of the latter, and on examining the appended drawing, in which:

FIG. 1 represents in block diagram form a computer network implementing a selective exchange system such as Bit-Torrent, FIG. 2 represents in a schematic and partial manner, an exemplary computer architecture for the implementation of the method according to the invention, and FIGS. 3 and 4 illustrate steps in the implementation of the invention.

The description which follows is given while assuming that the exchange system is BitTorrent and that the network is the Internet. Of course, this is merely an example and the invention can apply to other exchange systems and to other networks. The network can thus be, for example, a local network such as Ethernet or a university campus network. Networks using wireless technologies such as telephone networks may also be involved.

FIG. 1 represents the computer network 3 allowing the exchanges, in this instance Internet, to which are connected servers $1_1$ to $1_x$, trackers $4_1$ to $4_j$, clients $7_j$ not serving any peer free-riders), clients $8_1$ sharing data (leachers) and clients $9_m$ that are sources (seeders).

The clients $7_j$, $8_1$ and $9_m$ can be personal computers or other types of computer terminals, for example personal digital assistants, smartphones or more powerful machines, such as computer servers.

In the BitTorrent exchange system, the servers $1_1$ to $1_x$ contain general information 10 which identifies the file or files that can be downloaded, by describing attributes of the latter, for example the name, the size, the number of blocks, if any, and gives the address of the tracker or trackers $4_1$ to $4_y$ that supervise the distribution of a given file.

Each client $7_j$ to $9_m$ executes a client version of an item of exchange software 101 such as for example Bitcomet, Azureus, BitTorrent client officiel, Burst, G3torrent, ABC, etc., making it possible to connect to the trackers $4_1$ to $4_y$ and to share data with other clients interested in the same file.

The trackers $4_1$ to $4_y$ execute a tracker version of the exchange software 102.

In accordance with the invention, at least one controlled client $6_i$ is connected to the network 3.

This controlled client executes a modified client version 103 of the exchange software used by the other clients, this version making it possible to interrogate the trackers and to exchange with peers other than other controlled clients.

During the exchange between a controlled client $6_i$ and a tracker $4_p$, a list of all the peers connected to the network 3 and able to serve it is sent to this controlled client $6_i$. This list comprises notably at least the particulars of a source $9_m$ which possesses the entire coveted file. If no source address is present in the list sent by the tracker, the controlled client $6_i$ recontacts the tracker to request a new list.

This file to be downloaded can for example correspond to a film in the *.arr, *.mpg, *.mov, *.esf, *.wmv, *.dvx, *.qt, *.avi format, among others. It may also involve at least one music file in the *,wav, *.mp3, *.ra, *.ram, *.aiff, *.en *.mid format, among others or images in the *.jpg, *.bmp, *.png, *.tif, *.ps, *.eps format, among others. It may further involve software packages, games or any other program protected by intellectual property rights.

When the transfer by the source $9_m$ to a client $8_1$ of data is completed, the exchange software 101 executed by this client $8_1$ warns the other peers dealing with this client $8_1$ that this block is available at the latter.

If all the data are available on the network elsewhere than at the source $9_m$, the latter can disconnect.

FIG. 2 represents an exemplary computer architecture for the implementation of the invention, in which a server 20 is charged with supervising several controlled clients $6_1$, $6_2$ to $6_n$, n possibly being greater than or equal to 10 for example.

These controlled clients $6_i$ can be simulated by one and the same computer system 21 or as a variant, can be associated respectively with distinct terminals. If appropriate, the server 20 can be integrated into the computer system 21. The computer system 21 induces the controlled clients $6_i$ to perform first of all a search for the sources present in the network 3. Once these sources have been identified, the controlled clients connect to these sources so as to occupy them as much as possible. In the example illustrated, the controlled clients $6_1$ to $6_n$ are connected to various sources $9_1$ to $9_4$ of the network 3.

The controlled clients $6_i$ can also communicate with the tracker $4_p$ but are not designed to communicate, in the example considered, with the free-riders $7_j$.

FIG. 3 is a flowchart illustrating certain tasks performed by a controlled client $6_i$.

The objective of any controlled client $6_i$ is to be served for as long as possible by any source $9_m$ to which it is connected.

The controlled client $6_i$ can therefore first of all connect during a step 301 to the source $9_m$ with whose particulars it has been provided by the tracker $4_p$.

During the following step 302, if the client $6_i$ is served by the source $9_m$, it informs the server 20 thereof in step 303 and then performs step 302 again.

When the client $6_i$ is not served by the source $9_m$, it informs the server 20 thereof in the course of a step 304. The server 20 determines during a step 305 whether the source $9_m$, is already occupied by other controlled clients $6_i$.

In a common version of BitTorent, a source can serve four different clients. If these clients are already controlled clients, the controlled client $6_i$ is placed on standby in a step 306 for a certain wait, for example of the order of 20 seconds, before performing step 305 again, When the source $9_m$ does not serve solely controlled clients, the controlled client $6_i$ disconnects in the course of a step 307 from the source $9_m$ and recommences step 301, profiting from a characteristic of the BitTorent exchange system consisting in favoring, while a source $9_m$ is choosing the clients to be served, those which have connected most recently.

In accordance with an aspect of the invention, the controlled clients transmit to the source $9_m$ false indications relating to their download speed, indicating for example a greater speed than that of the other clients in the network.

The controlled clients $6_i$ periodically send requests to the tracker $4_p$. These requests comprise the number of bytes received, a false number of sent bytes and the number of bytes remaining to be received. The false data make it possible to falsify the statistics of the tracker $4_p$ and to favor the controlled clients $6_i$ during the selection procedure performed by the exchange software 102.

These requests can be sent at a period dependent on the size T (in megabytes) of the content to be downloaded and the number $N_{sources}$ of sources in the network, according to the relation $$\begin{cases} \tau = \dfrac{T}{N_{sources}} * k \\ \tau = 10 \text{ seconds if } N_{sources} < 50, \end{cases}$$

k being an empirically fixed constant.

The request addressed to the tracker also comprises the current state of the controlled client, that is to say whether it has just begun the transfer, whether transfer is in progress, or whether it has finished the transfer.

The tracker $4_p$ responds to this request by sending a list of peers interested in the same file.

The above value of $\tau$ makes it possible to increase the probability that a controlled client $6_i$ is connected to the whole set of sources $9_m$ present in the network, a controlled client $6_i$ being able to connect up for example to more than 1000 sources at a time.

The server 20 is designed to log the number of sources to which each controlled client $6_i$ is connected and supervises the progress of the downloading of the file. Once a controlled client $6_i$ has terminated downloading the content, the server 20 causes the erasure of the content downloaded by this controlled client $6_i$.

FIG. 4 is a flowchart illustrating certain tasks performed by the server 20.

During a first step 401, the particulars of a source $9_m$ are communicated to a controlled client $6_i$ on standby waiting to connect.

During a following step 402, the server 20 recovers information that this controlled client $6_i$ sends it and which enables it for example to update the list and/or the number of controlled clients served by a source $9_m$.

In step 403, the server 20 evaluates whether the controlled client $6_i$ has terminated the download. If this is the case, the download is stopped in step 404, and its content is thereafter destroyed in step 405, then the server recommences step 401.

When the download is not finished, the server 20 evaluates in the course of step 406 whether the controlled client $6_i$ is still served by the source $9_m$. If this is still the case, the server 20 updates the occupancy state of the sources.

When the controlled client $6_i$ is no longer served by the source $9_m$, it can, in the course of a step 408, request information from the server 20 relating for example to the number of controlled clients currently connected to this source. The server 20 then provides the information requested to the controlled client $6_i$ before recommencing step 402.

If the controlled client $6_i$ has not requested any information, the server 20 performs the step 407 of updating the data, in particular the occupancy state of the sources.

The invention is not limited to the BitTorent exchange system and also applies to other exchange systems of the same type.

The invention can be implemented jointly with other measures intended to combat the illicit distribution of protected material.

The expression "comprising a" should be understood as being synonymous with "comprising at least one" unless specified otherwise.

The invention claimed is:

1. A method for at least one of hindering, and eliminating, illegal propagation of protected data in a peer to peer network comprising at least one remote client having all or part of data that are searched for executing exchange software configured to distribute the data that are searched for to at least one client of clients in the peer to peer network according to a selective exchange protocol allowing the at least one remote client having all or part of the data that are searched for to make a selection of the clients in the network to which the data that are searched for are transferred, this selection being performed as a function of at least one characteristic of the clients in the network, the clients in the network comprising at least one controlled client, in which:

false data are addressed to the at least one remote client having all or part of the data that are searched for so as to influence the selection of the clients in the network served by the at least one remote client having all or part of the data that are searched for, in order to induce the at least one remote client having all or part of the data that are searched for to favor transfer to the at least one controlled client, the at least one characteristic of the at least one controlled client comprising:

a progress of a downloading of the data that are searched for, the exchange software being configured to favor the transfer of the data that are searched for to the clients in the network that have progressed the most in downloading the data that are searched for, and wherein the at least one controlled client sends the false data which comprises a false indication about the progress of the downloading that is greater than that of other clients in the network;

an item of information relating to an upload of the at least one client in the network, and wherein the false data sent by the at least one controlled client comprises a false indication relating to the upload of the at least one controlled client that is greater than that of the other clients in the network; and speed of transfer of the data that are searched for from the at least one remote client having all or part of the data that are searched for to the at least one client in the network, and wherein the false data sent by the at least one controlled client comprises a false indication relating to the speed of transfer that is greater than that of the other clients in the network from the at least one remote client having all or part of the data that are searched for to the at least one controlled client.

2. The method as claimed in claim 1, in which the false data are addressed to the remote client having all or part of the data that are searched for by the at least one controlled client.

3. The method as claimed in claim 1, the peer to peer network being of BitTorent of similar exchange system type.

4. The method as claimed in claim 1, the at least one controlled client being configured to seek to download files that are same ones most searched for by the other clients of the network.

5. The method as claimed in claim 1, a number of controlled clients is in a range of 10 to 25.

6. The method as claimed in claim 1, the at least one controlled client being configured to communicate with a server configured to supervise said at least one controlled client.

7. The method as claimed in claim 1, the at least one controlled client being configured to connect only to sources.

8. The method as claimed in claim 1, the at least one controlled client being configured so as not to share information with the other clients of the network, said other clients of the network being different from the at least one controlled clients.

9. The method as claimed in claim 1, the network comprising at least one tracker configured to transmit to the at least one client in the network, addresses of the at least one client in the network or the at least one remote client having all or part of the data that are searched for in the network, in which false information is addressed to the tracker by the at least one controlled client.

10. The method as claimed in claim 9, the false information comprising a false item of information relating to a quantity of data sent by the at least one controlled client to the other clients of the network, said other clients of the network being different from the at least one controlled client.

11. The method as claimed in claim 9, in which each controlled client is configured to connect to the tracker so as to recover a list of addresses of clients of the network and in a case where not source address appears in the list of addresses, to reconnect to the tracker so as to obtain a new list of addresses.

12. The method as claimed in claim 9, the false information comprising at least one of:

a false item of information relating to a quantity of data sent by the at least one remote client having all or part of the data that are searched for to the at least one controlled client, and a false item of information relating to a quantity of data that the at least one remote client having all or part of the data that are searched for must still send to the at least one controlled client.

13. The method as claimed in claim 9, in which the false data sent to the tracker is sent in a periodic manner.

14. The method as claimed in claim 1, in which after the connection of the at least controlled client to the at least one remote client having all or part of the data that are searched for, said at least one controlled client not being served by the at least one remote client having all or part of the data that are searched for and a number of controlled clients served by the remote client having all or part of the data that are searched for being less than a maximum number of clients that the at least one remote client having all or part of the data that are searched for can serve, said at least one controlled client is disconnected from the at least one remote client having all or part of the data that are searched for, then a new controlled client is connected to the at least one remote client having all or part of the data that are searched for.

15. The method as claimed in claim 1 in which a number of controlled clients connected to each remote client having all or part of the data that are searched for is reckoned.

16. A computer system intended to hinder or eliminate illegal propagation of protected data in a peer to peer network, in which at least one remote client having all or part of data that are searched for executes exchange software configured to distribute data to at least one client of clients in the peer to peer network according to a selective exchange protocol allowing the at least one remote client having all or part of the data that are searched for to make a selection of the clients in the network to which the data that are searched for are transferred, this selection being performed as a function of data representative of one or more characteristics of the clients in the network, the computer system comprising at least one controlled client configured to generate false data so as to influence the selection of the clients in the network to which the data that are searched for are transferred by the at least one remote client having all or part of the data that are searched for and to induce the at least one remote client having all or part of the data that are searched for to favor transfer to said at least one controlled client, the at least one characteristic of the at least one controlled client comprising:

a progress of a downloading of the data that are searched for, the exchange software being configured to favor the transfer of the data that are searched for to clients in the network that have progressed the most in downloading the data that are searched for, and wherein the at least one controlled client sends the false data which comprises a false indication about the progress of the downloading that is greater than that of other clients in the network;

an item of information relating to an upload of the at least one client in the network, and wherein the false data sent by the at least one controlled client comprises a false indication relating to the upload of the at least one controlled client that is greater than that of other clients in the network; and speed of transfer of the data that are searched for from the at least one remote client having all or part of the data that are searched for to the at least one client in the network, and wherein the false data sent by the at least one controlled client comprises a false indication relating to the speed of transfer that is greater than that of the other clients in the network from the at least one remote client having all or part of the data that are searched for to the at least one controlled client.

17. A computer program product embodied on a non-transitory computer readable medium, the computer program product comprising instructions readable by a computer system comprising at least one microprocessor, these instructions controlling operation of the computer system in such a way that:

in a peer to peer network comprising at least one remote client having all or part of data that are searched for executing exchange software configured to serve at least one client of clients in the network according to a selective exchange protocol allowing the at least one remote client having all or part of the data that are searched for to perform a selection of the clients in the network served as a function of at least one characteristic of the clients in the network, false data are generated by the computer system, so as to influence the selection of the clients in the network to which the data that are searched for are transferred by the at least one remote client having all or part of the data that are searched for, and induce the at least one remote client having all or part of the data that are searched for to favor transfer to at least one controlled client computer system, the at least one characteristic of the at least one controlled client computer system comprising:

a progress of a downloading of the data that are searched for, the exchange software being configured to favor the transfer of the data that are searched for to clients in the network that have progressed the most in downloading the data that are searched for, and wherein the at least one controlled client computer system sends the false data which comprises a false indication about the progress of the downloading that is greater than that of other clients in the network;

an item of information relating to an upload of the at least one client in the network, and wherein the false data sent by the at least one controlled client computer system comprises a false indication relating to the upload of the at least one controlled client computer system that is greater than that of the other clients in the network; and speed of transfer of the data that are searched for from the at least one remote client having all or part of the data that are searched for to the at least one client in the network, and wherein the false data sent by the at least one controlled client computer system comprises a false indication relating to the speed of transfer that is greater than that of the other clients in the network from the at least one remote client having all or part of the data that are searched for to the at least one controlled client computer system.

* * * * *